(12) United States Patent
Haberman et al.

(10) Patent No.: US 12,167,057 B2
(45) Date of Patent: *Dec. 10, 2024

(54) DYNAMIC BANDWIDTH ALLOCATION FOR ADDRESSABLE CONTENT

(71) Applicant: Adeia Media Holdings LLC, San Jose, CA (US)

(72) Inventors: Seth Haberman, New York, NY (US); Gerrit Niemeijer, Maplewood, NJ (US); Alex Jansen, Jersey City, NJ (US); Erik van de Pol, South Orange, NJ (US); Andrew Fife, Hoboken, NJ (US)

(73) Assignee: Adeia Media Holdings LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,022

(22) Filed: Aug. 11, 2023

(65) Prior Publication Data

US 2024/0040172 A1 Feb. 1, 2024

Related U.S. Application Data

(63) Continuation of application No. 16/871,756, filed on May 11, 2020, now abandoned, which is a
(Continued)

(51) Int. Cl.
*H04N 21/2385* (2011.01)
*H04H 20/10* (2008.01)
(Continued)

(52) U.S. Cl.
CPC ...... *H04N 21/2385* (2013.01); *H04H 20/103* (2013.01); *H04L 67/53* (2022.05);
(Continued)

(58) Field of Classification Search
None
See application file for complete search history.

(56) References Cited

U.S. PATENT DOCUMENTS

| 5,446,919 A | 8/1995 | Wilkins | |
|---|---|---|---|
| 6,463,585 B1 * | 10/2002 | Hendricks | H04N 21/47 348/E5.103 |

(Continued)

FOREIGN PATENT DOCUMENTS

| EP | 1873630 B1 | 11/2011 |
|---|---|---|
| JP | 2002164886 A | 6/2002 |

(Continued)

OTHER PUBLICATIONS

Dureau, Vincent et al, "Addressable Advertising on Digital Television," International Broadcasting Conference 2004, Sep. 10, 2004, Amsterdam, pp. 1-15.

(Continued)

*Primary Examiner* — Mushfikh I Alam
(74) *Attorney, Agent, or Firm* — Haley Guiliano LLP

(57) ABSTRACT

Systems and methods for push-based dynamic bandwidth allocation deliver addressable, advertising content in a digital network. Bandwidth is allocated on a push basis in response to receiving a trigger from a content distribution stream. The trigger contains data indicating an addressable break. A portion of bandwidth is then allocated to an addressable content stream based on the data of the trigger. The addressable content stream is then streamed to a receiver during the addressable break and the receiver is tuned from the broadcast stream to the addressable content stream for the duration of the addressable break. The additional bandwidth is de-allocated at the end of the addressable break.

20 Claims, 10 Drawing Sheets

Related U.S. Application Data continuation of application No. 16/284,709, filed on Feb. 25, 2019, now Pat. No. 10,694,232, which is a continuation of application No. 15/844,680, filed on Dec. 18, 2017, now Pat. No. 10,257,550, which is a continuation of application No. 15/417,354, filed on Jan. 27, 2017, now Pat. No. 9,866,880, which is a continuation of application No. 14/792,041, filed on Jul. 6, 2015, now Pat. No. 9,560,396, which is a continuation of application No. 13/455,773, filed on Apr. 25, 2012, now Pat. No. 9,077,757, which is a continuation of application No. 12/512,769, filed on Jul. 30, 2009, now Pat. No. 8,171,511.

(60) Provisional application No. 61/084,739, filed on Jul. 30, 2008.

(51) Int. Cl.
| | | |
|---|---|---|
| *H04L 67/53* | (2022.01) | |
| *H04L 67/55* | (2022.01) | |
| *H04L 67/62* | (2022.01) | |
| *H04N 21/234* | (2011.01) | |
| *H04N 21/239* | (2011.01) | |
| *H04N 21/438* | (2011.01) | |
| *H04N 21/81* | (2011.01) | |
| *H04N 21/845* | (2011.01) | |
| *H04H 20/42* | (2008.01) | |
| *H04N 21/478* | (2011.01) | |

(52) U.S. Cl.
CPC .............. *H04L 67/55* (2022.05); *H04L 67/62* (2022.05); *H04N 21/23424* (2013.01); *H04N 21/2393* (2013.01); *H04N 21/4383* (2013.01); *H04N 21/812* (2013.01); *H04N 21/8456* (2013.01); *H04H 20/42* (2013.01); *H04N 21/478* (2013.01)

(56) References Cited

U.S. PATENT DOCUMENTS

| | | | |
|---|---|---|---|
| 6,909,726 B1* | 6/2005 | Sheeran | H04L 47/15 |
| | | | 370/468 |
| 7,876,259 B2* | 1/2011 | Schuchman | G07C 5/008 |
| | | | 342/36 |
| 8,019,162 B2 | 9/2011 | Zhang et al. | |
| 8,171,511 B2 | 5/2012 | Haberman et al. | |
| 8,176,520 B1* | 5/2012 | Mitchell | H04N 21/6143 |
| | | | 709/248 |
| 9,077,757 B2 | 7/2015 | Haberman et al. | |
| 9,560,396 B2 | 1/2017 | Haberman et al. | |
| 9,866,880 B2 | 1/2018 | Haberman et al. | |
| 10,257,550 B2 | 4/2019 | Haberman et al. | |
| 10,694,232 B2 | 6/2020 | Haberman et al. | |
| 11,290,759 B2 | 3/2022 | Haberman et al. | |
| 2001/0001616 A1* | 5/2001 | Rakib | H04L 1/006 |
| | | | 375/259 |
| 2003/0009765 A1* | 1/2003 | Linden | H04N 21/233 |
| | | | 725/95 |
| 2003/0179769 A1 | 9/2003 | Shi et al. | |
| 2003/0191851 A1 | 10/2003 | Edwards | |
| 2005/0039205 A1 | 2/2005 | Riedl | |
| 2006/0041921 A1 | 2/2006 | Hane | |
| 2006/0106672 A1* | 5/2006 | Mo | H04L 12/437 |
| | | | 705/14.69 |
| 2006/0143675 A1 | 6/2006 | Willis et al. | |
| 2006/0293954 A1* | 12/2006 | Anderson | H04N 21/2221 |
| | | | 348/E7.071 |
| 2007/0064739 A1 | 3/2007 | Krishnamachari | |
| 2008/0034386 A1* | 2/2008 | Cherry | H04N 7/165 |
| | | | 725/35 |
| 2008/0229025 A1* | 9/2008 | Plamondon | G06F 12/0862 |
| | | | 709/218 |
| 2008/0310301 A1* | 12/2008 | Wade, Jr. | H04N 21/26216 |
| | | | 370/230 |
| 2009/0161688 A1 | 6/2009 | Park et al. | |
| 2009/0217326 A1 | 8/2009 | Hasek | |
| 2011/0296458 A1* | 12/2011 | Di Mattia | H04N 21/23655 |
| | | | 725/36 |
| 2012/0023522 A1 | 1/2012 | Anderson et al. | |
| 2012/0272285 A1 | 10/2012 | Brooks et al. | |
| 2014/0344443 A1* | 11/2014 | Macinnis | H04L 65/00 |
| | | | 709/224 |
| 2020/0344502 A1 | 10/2020 | Haberman et al. | |

FOREIGN PATENT DOCUMENTS

| | | |
|---|---|---|
| JP | 2002325097 A | 11/2002 |
| JP | 2003051846 A | 2/2003 |
| JP | 2015130694 A | 7/2015 |
| JP | 6273857 B2 | 1/2018 |
| WO | 0184824 A2 | 11/2001 |
| WO | 2005057322 A2 | 6/2005 |
| WO | 2007088482 A1 | 8/2007 |
| WO | 2007149458 A2 | 12/2007 |

OTHER PUBLICATIONS

Extended European Search Report and European Search Opinion, Dec. 12, 2013, from corresponding European Patent Application No. 09803602.3.

* cited by examiner

DYNAMIC BANDWIDTH ALLOCATION FOR ADDRESSABLE CONTENT

CROSS-REFERENCE TO RELATED APPLICATIONS

This application is a continuation of U.S. patent application Ser. No. 16/871,756, filed May 11, 2020, which is a continuation of U.S. patent application Ser. No. 16/284,709 (now U.S. Pat. No. 10,694,232), filed Feb. 25, 2019, which is a continuation of U.S. patent application Ser. No. 15/844,680 (now U.S. Pat. No. 10,257,550), filed Dec. 18, 2017, which is a continuation of U.S. patent application Ser. No. 15/417,354 (now U.S. Pat. No. 9,866,880), filed Jan. 27, 2017, which is a continuation of U.S. patent application Ser. No. 14/792,041 (now U.S. Pat. No. 9,560,396), filed Jul. 6, 2015, which is a continuation of U.S. patent application Ser. No. 13/455,773 (now U.S. Pat. No. 9,077,757), filed Apr. 25, 2012, which is a continuation of U.S. patent application Ser. No. 12/512,769 (now U.S. Pat. No. 8,171,511), filed Jul. 30, 2009, which claims the benefit of U.S. Provisional Application No. 61/084,739, filed Jul. 30, 2008, the disclosures of which are hereby incorporated by reference herein in their entireties.

FIELD OF INVENTION

The present invention generally relates to cable transmission, and more specifically to methods and systems for dynamic bandwidth allocation for addressable content.

BACKGROUND

Cable operators and vendors, such as Big Band, Motorola, Cisco, and Imagine Communications, have developed and are further refining systems to measure bandwidth demand or "pull" by cable consumers and allocate capacity within a cable plant node on a real-time dynamic basis. These types of systems are referred to as "switched digital video" systems. Switched digital video ("SDV") systems are being implemented to resolve growing consumer demand of cable bit/bandwidth. With hundreds of possible television channels and an increasing number of high-definition ("HD") channels, cable service providers are being stretched to the limits of their network capacity in order to provide uninterrupted, quality service to their subscribers. In addition to audio and video data transmitted for television services, many providers also package Internet, Video-on-Demand and digital telephone services to subscribers—all within the same cable infrastructure.

To accommodate the increased demand for bandwidth, cable providers limit the transmission of a particular channel until it is requested by a subscriber. For example, a certain channel is not constantly broadcast to a home, or neighborhood. When a subscriber tunes to that channel on the digital set-top box, a signal is sent to the cable provider to "turn-on" the channel. The provider then transmits the stream of data containing that channel's video and audio through the cable to the set-top box and on to the subscriber's television. Should a second subscriber in the same service area call up that same channel, the stream is forwarded on to that set top box eliminating the need for a second stream of the same channel.

The transmission speeds of signals over the cable lines is fast enough that the subscriber is unaware that seconds before tuning to that station, the station was not being broadcast at all.

Current switched digital video systems are designed to alleviate and overcome bandwidth transmission limitations from the consumer on a "pull" basis (i.e., dynamically allocating bandwidth based upon subscriber usage and demand). For example, when a digital Cable TV subscriber starts a Video-On-Demand ("VOD") session to watch a movie, a traditional sequence of events includes following steps: the subscriber selects a particular piece of On-Demand content from the menu on the Digital Cable Set-top Box ("DSTB"); the DSTB initiates a request to the back-end VOD server to start a session; the VOD server performs some authentication and/or billing functions; and then the VOD server allocates the content. The VOD server then will attempt to allocate bandwidth for this session. If no bandwidth can be allocated at the time of the request, the VOD server will notify the DSTB which will then inform the user of the failed VOD session with an "Error: Please try again later" message.

Once bandwidth is allocated, the VOD server will begin streaming the content (via the newly allocated bandwidth) to the DSTB, where it is rendered to the subscriber. After the session is over (either because the subscriber actively stopped the session, or because the session timed out), the bandwidth is de-allocated and returned to the network.

Another example of the traditional "pull-based" model of bandwidth allocation occurs when a digital Cable TV subscriber changes channels in a cable system that uses SDV technology to save bandwidth. The subscriber requests the DSTB to tune from channel X to channel Y, either through a Program Guide, or by pressing a Channel-Up/Channel-Down button on the remote control, or by entering the channel number directly on the remote control. The DSTB initiates a request to the back-end SDV server conveying that the DSTB will leave channel X and tune to channel Y. The SDV server will first check if this was the only viewer in the service area that was still watching channel X; if that is the case, the SDV server will remove channel X from the active channel line-up for this particular cable system service areas, and de-allocate the bandwidth that the channel data stream station was occupying.

The SDV server will then check to see if channel Y is already available in the active channel line-up for this particular cable system service area (signifying that at least one other subscriber's DSTB in the service area is tuned to this channel already); if it is not yet available, the SDV server will allocate bandwidth for it and add it to the active channel line-up. The SDV server will then send a message back to the DSTB to indicate the (new) position of channel Y in the active channel line-up, at a position 'n'). Upon receipt of this message, the DSTB will tune to position n, and the viewer will start viewing channel Y.

There remains an untapped resource for cable and satellite service providers, as well as advertisers alike in adapting a dynamic bandwidth allocation protocol on a "push" basis to opportunistically exploit the gaps or holes in the available bandwidth efficiently and effectively. That is, dynamically allocating available bandwidth to certain channels for the inclusion of additional services, such as advanced advertising and content delivery, while minimizing bandwidth allocated to a channel but not which is being used.

SUMMARY OF THE INVENTION

Embodiments of the invention include systems and methods for dynamic bandwidth allocation to deliver addressable, advertising content in a digital network to users, using allocation techniques driven by asynchronous events related to the advertising content, instead of being requested by an end-user (in other words, it is based on a "push model" instead of on a "pull model"). Embodiments of the system are described herein in the context of addressable content in a multi-cast multimedia network (e.g. a digital cable TV system, or a Direct To Home satellite TV system), however one skilled on the art should recognize the invention is equally applicable to other content-initiated bandwidth allocation systems as well (for example it could be used to allocate bandwidth to send personalized news or sports sequences to TV viewers).

According to one embodiment, a method of allocating bandwidth on a push basis includes receiving a cue tone from a broadcast stream. The cue tone contains data indicating an addressable break. A portion of additional bandwidth is then allocated to an addressable content stream based on the data of the cue tone. The addressable content stream is then streamed to a receiver during the addressable break and the receiver is tuned from the broadcast stream to the addressable content stream for the duration of the addressable break. The additional bandwidth is de-allocated at the end of the addressable break.

Another embodiment of the invention includes a system for dynamically allocating bandwidth. The system includes a storage server containing addressable content and a splicer that is capable of receiving a broadcast stream inserting a stream of the addressable content from the storage server into the broadcast stream. An edge device is included which is capable of detecting a cue tone in the broadcast stream. The cue tone contains data indicating an addressable break. The edge device is further capable of allocating a portion of bandwidth to the stream of the addressable content based on the data of the cue tone for a duration. The edge device is also capable of de-allocating the portion of bandwidth at the end of the duration of the addressable break.

Another embodiment of the invention includes a system for dynamically allocating bandwidth having a splicer capable of receiving and transmitting a broadcast stream. The splicer detects a cue tone in the broadcast stream. The cue tone contains data indicating an addressable break. The system also includes a storage server containing addressable content. The storage server is capable of transmitting an addressable content stream and allocates a portion of bandwidth for a duration to the addressable content stream based on the data of the cue tone. The storage server de-allocates the portion of bandwidth at the end of the duration of the addressable break.

Another embodiment of the invention includes a system for dynamically allocating bandwidth including a splicer for receiving and transmitting a broadcast stream. The splicer detects a cue tone in the broadcast stream which contains data indicating an addressable break. A storage server contains addressable content and transmits an addressable content stream. A resource manager receives a request for additional bandwidth from the storage server. The resource manager defines a subnetwork of available subscribers and determines a portion of the available subscribers in the subnetwork selected to receive the addressable content. The resource manager allocates a portion of the bandwidth for a duration to the addressable content stream based on the data of the cue tone and the portion of available subscribers in the subnetwork selected to receive the addressable content. The resource manager then de-allocates the portion of bandwidth at the end of the duration of the addressable break.

In yet another embodiment of the invention, a system for dynamically allocating bandwidth includes components for receiving a cue tone from a broadcast stream. The cue tone includes data indicating at least the beginning of an addressable break in the broadcast stream. The system also includes components for allocating a portion of available bandwidth to an addressable content stream based on the data of the cue tone and components for streaming the addressable content stream to a receiver during the addressable break. Components for tuning the receiver from the broadcast stream to the addressable content stream for the duration of the addressable break are also included. Lastly, the system includes components for de-allocating the portion of bandwidth at the end of the addressable break.

BRIEF DESCRIPTION OF THE DRAWINGS

These embodiments and other aspects of this invention will be readily apparent from the detailed description below and the appended drawings, which are meant to illustrate and not to limit the invention, and in which.

DETAILED DESCRIPTION

The invention will be more completely understood through the following detailed description, which should be read in conjunction with the attached drawings. Detailed embodiments of the invention are disclosed herein, however, it is to be understood that the disclosed embodiments are merely exemplary of the invention, which may be embodied in various forms. Therefore, specific functional details disclosed herein are not to be interpreted as limiting, but merely as a basis for the claims and as a representative basis for teaching one skilled in the field to variously employ the invention in virtually any appropriately detailed embodiment.

Embodiments of the invention include systems and methods for dynamic bandwidth allocation to deliver addressable, advertising content in a digital network to users, using allocation techniques driven by asynchronous events related to the content, instead of being requested by an end-user (in other words, it is based on a "push model" instead of on a "pull model").

Figure 1:
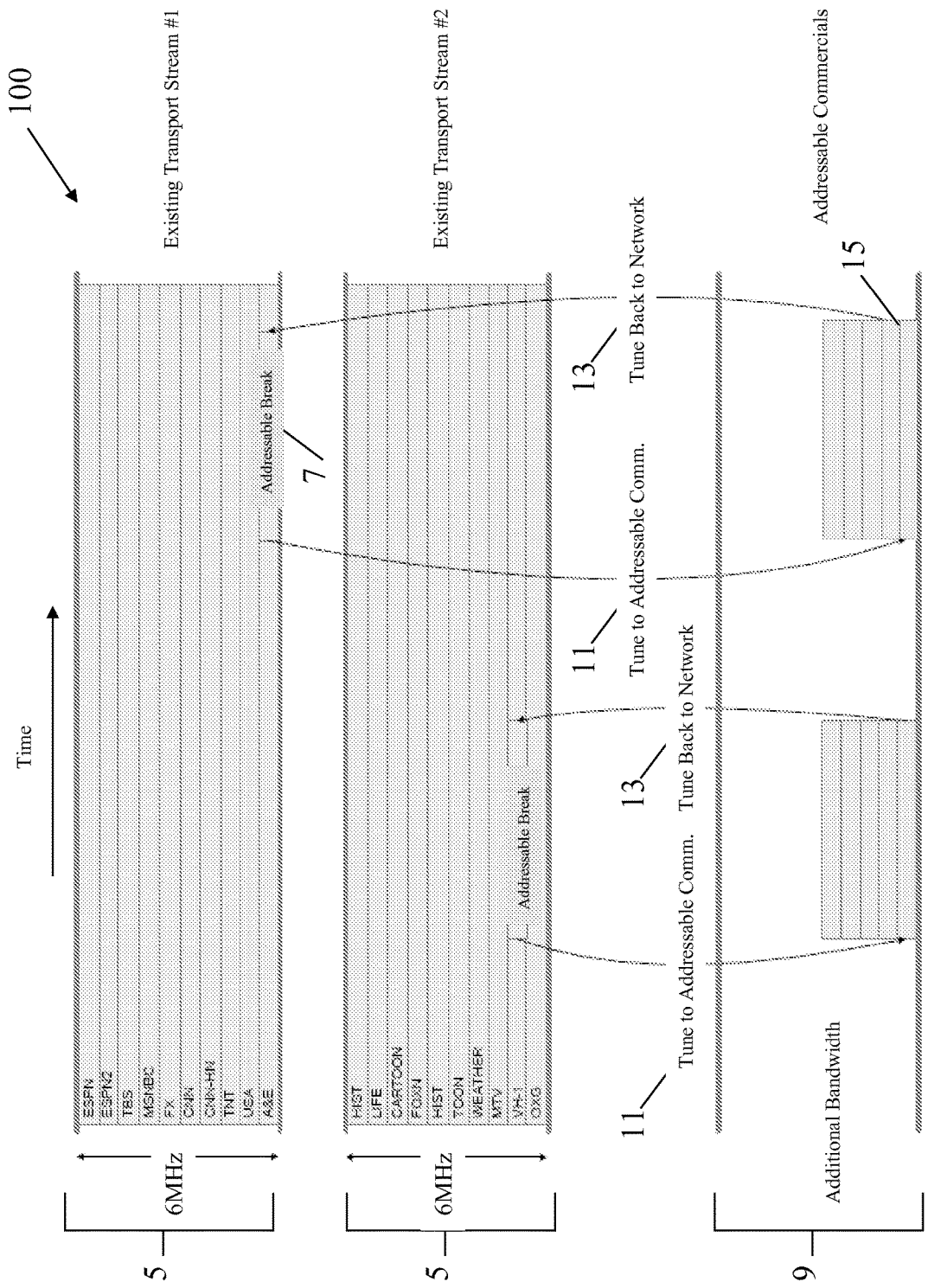
FIG. 1 is a diagram of frequency allocations of a broadcast type cable delivery streaming system including addressable advertisements.

Turning now to FIG. 1, frequency allocations 100 for a system for addressable advertising in a digital cable system is depicted in accordance with an embodiment of the invention. As depicted in the illustrative figure, the system includes, without limitation, a number of linear local ad-supported cable networks 5 (shown as a function of Time): twenty broadcast networks transmitted in two distinct transport streams broadcast at 6 MHz intervals. Each network may have its own local addressable breaks 7 at pre-defined times in regularly scheduled programming for advertisements or other addressable content. During these breaks, addressable commercials are streamed through additional bandwidth 9 and the DSTBs that are tuned to the regularly scheduled program are forcibly tuned 11 away from the program to a particular advertisement 15. The DSTBs will tune back to the network program 13 at the end of the commercial. The illustrative system can tailor advertising content within the linear broadcast network content by matching demographic profiles of the subscribers with a particular selection of addressable commercial content suited for the subscriber. For example, if a subscriber's credit score is above a certain threshold and maintains a substantially high household income then addressable content for a premium credit card may, such as a gold or platinum card be may be selected to present to the subscriber during a break.

Traditional approaches to bandwidth allocation for such an addressable advertising systems have been based on either static bandwidth allocation (i.e., allocate the bandwidth at all times), or schedule-based bandwidth allocation (i.e., allocate the bandwidth when an addressable break is scheduled). Local advertising breaks follow a schedule that is unique per network. For example on ESPN's broadcast channel, advertising breaks occurring between 5:30 A.M. and 6:30 A.M. on a particular day may be scheduled as follows:

Tuesday Jan. 1, 2009, 5:45 am, a 0:30 second break
Tuesday Jan. 1, 2009, 6:12 am, a 0:60 second break
Tuesday Jan. 1, 2009, 6:43 am, a 0:60 second break
Tuesday Jan. 1, 2009, 7:14 am, a 0:90 second break Other networks may each have their own unique schedule tailored to their respective broadcasted programs.

In practice, however, the scheduled time for an addressable break may be only indicative. That is, the actual time when the break occurs may differ slightly (or sometimes significantly) from the scheduled time. When broadcasting live events or alternative programming due to scheduling conflicts or blackout restrictions, for example, broadcast programmers cannot predict or ensure when programming breaks will occur. Holding the break time as an indicator offers flexibility to the network programmer to shift commercial breaks based on unpredictable programming schedules. To remedy the inaccuracy in predicted scheduling times, broadcast programmers and service providers use a window concept. A window provides a time interval for which a scheduled break is valid. A break may be scheduled for 5:10 A.M., with a window open-time of 5:00 A.M. and a window close time of 5:20 A.M., which means that the break is scheduled for 5:10 A.M., but could occur as early as 5:00 A.M. and as late as 5:20 A.M. Any break that occurs during that window is considered to be the 5:10 A.M. break, even if it did not actually occur at that precise time.

Figure 2:
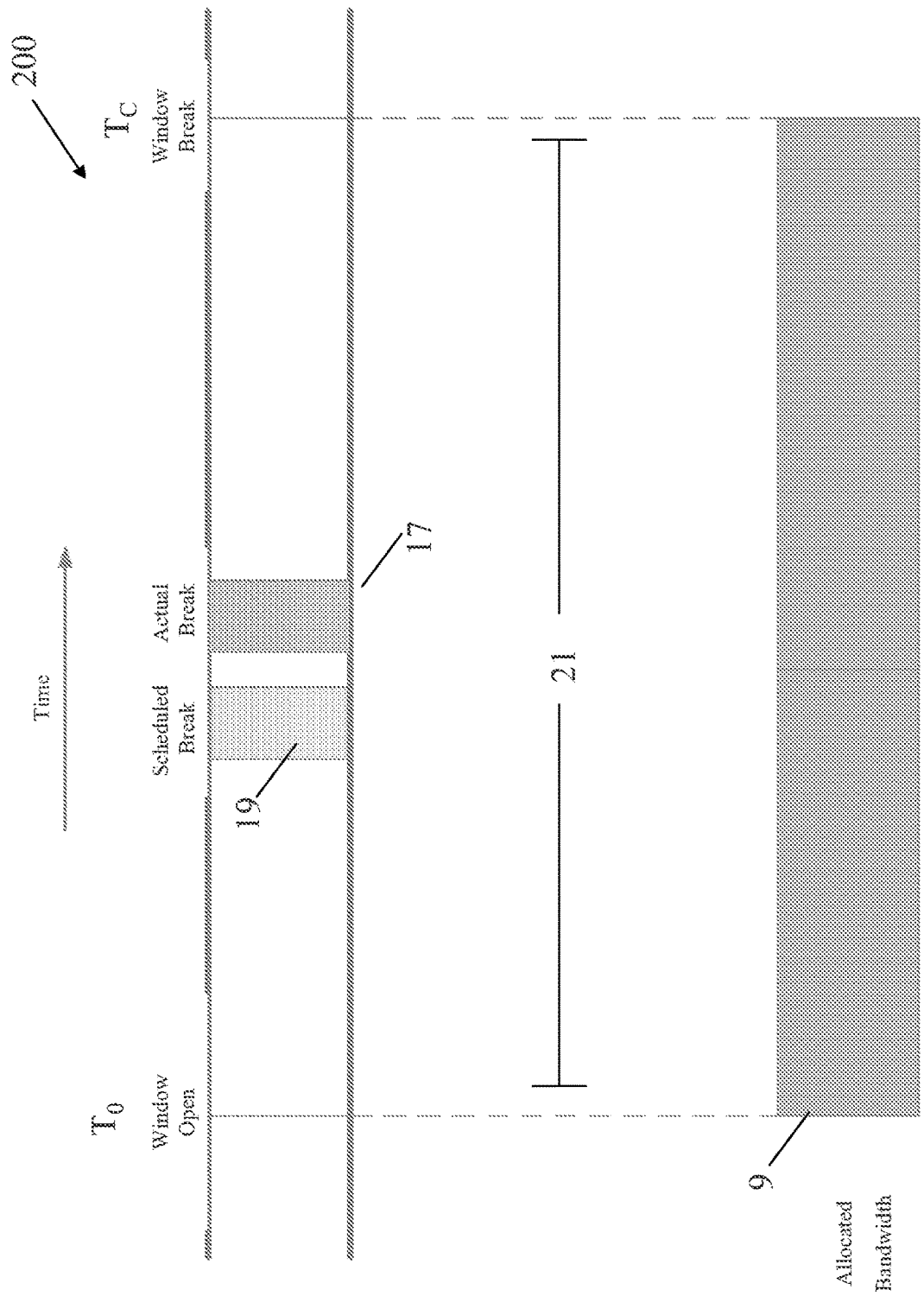
FIG. 2 is a timeline depiction of bandwidth allocation in a network stream as a function of time.

Bandwidth allocation for addressable breaks cannot be based on scheduled time, as described above, because it is inaccurate. Thus, bandwidth (and other resources) for addressable breaks is allocated based on the break window as described above. In traditional allocation systems, bandwidth is allocated for the full duration of the break window, because that is the defined time interval when the scheduled break might occur. FIG. 2 depicts the frequency allocations 200 for a traditional window-based bandwidth allocation system. As the broadcast stream progresses through time, a window 21 opens at time, $T_0$, which is the time the additional content bandwidth 9 is allocated for that stream. If the actual break interval 17 occurs at a different time than the scheduled break interval 19, the bandwidth 9 is still available because the bandwidth 9 is allocated for the entire window period 21, ending at time $T_C$.

This schedule-based system or, more accurately, window-based system, of bandwidth allocation is functional, but is also inefficient. Bandwidth is a scarce resource in many digital broadcast systems, and the window-based allocation approach locks up bandwidth for the full duration of a window, while it is only effectively being used for the duration of the break, a fraction of the entire window. For example, if a window size of twenty minutes is selected for a sixty-second break, then the bandwidth is allocated for twenty minutes; however the bandwidth is only actually used for the sixty seconds, so the time-bandwidth allocation, in this example is twenty times higher than the actually needed time-bandwidth to broadcast the addressable content.

Figure 3:
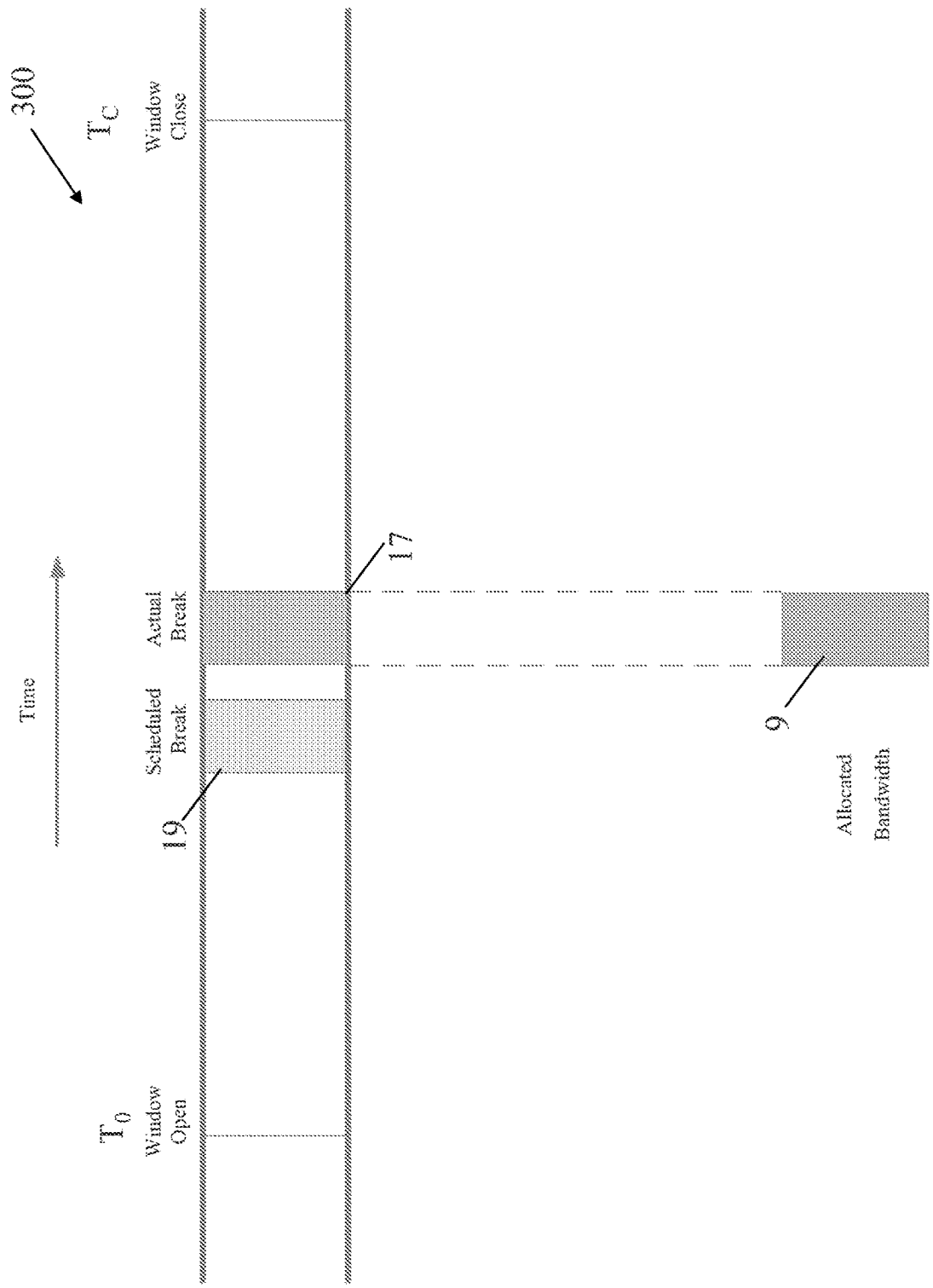
FIG. 3 is a timeline depiction of bandwidth allocation in a network stream as a function of time in accordance with an embodiment of the invention.

One embodiment of the invention, as depicted in FIG. 3, includes a frequency bandwidth illustration 300 for a system using real-time break programming data to allocate bandwidth 9 only when an actual break 17 occurs. When a broadcast system knows when an addressable break 17 is going to occur, a form of pre-roll notification called a "cue tone" is transmitted. Traditionally these cue tones were audio tones, however with the proliferation of digital signal processing and broadcast transmission, digital cue tones, as described in the American National Standards Institute ("ANSI") and Society of Cable and Telecommunications Engineers ("SCTE") Standard 35, are being used increasingly. Other (more proprietary) cue tones are in existence as well such as Internet-Protocol ("IP")-based cue tones. Cue tones may sound or trigger up to several seconds before the actual break occurs, and contain precise information identifying the actual start-time and stop-time of the break.

Figure 4:
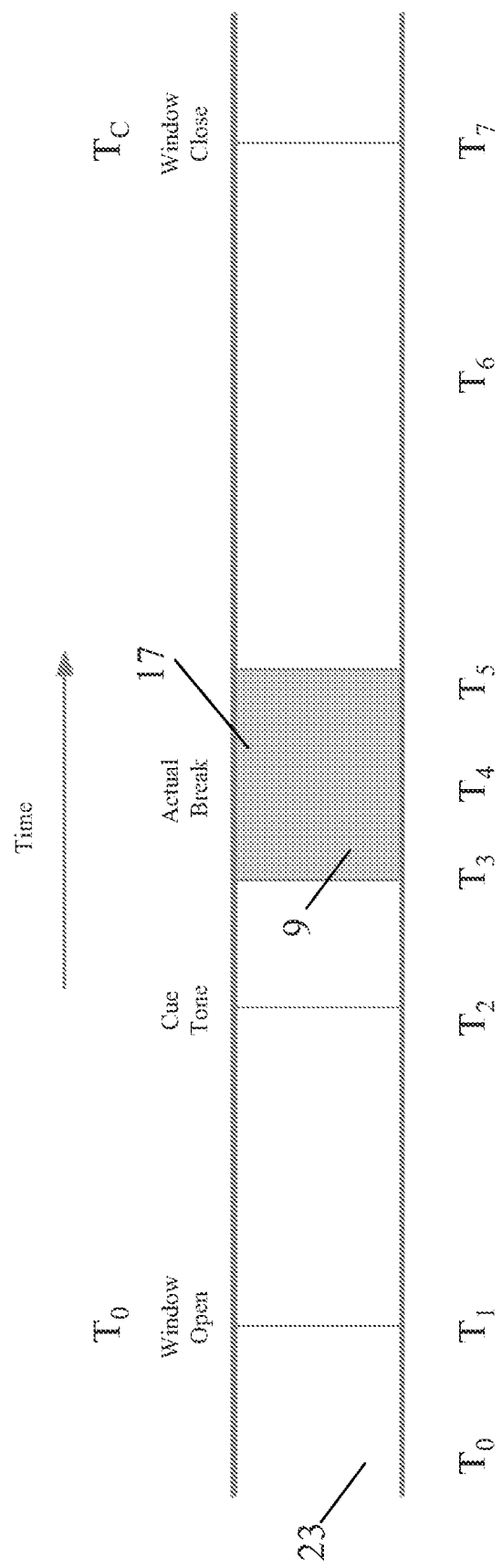
FIG. 4 is a timeline depiction of bandwidth allocation in a network stream as a function of time in accordance with an embodiment of the invention.

One embodiment of the invention uses these tones to create an efficient, real-time dynamic bandwidth allocation system for addressable advertising as illustrated in FIG. 4. A broadcast stream 23 including the addressable content stream (shown here overlapping the broadcast stream) is shown as a function of time T, defining the events associated with the bandwidth allocation of the embodiment. At time $T_0$ no additional bandwidth is allocated to the addressable content, and regularly scheduled programming of the network broadcast is being transmitted the subscriber on the tuned channel. At time $T_1$, an addressable break window is opened, as traditional broadcast systems would use, however in this embodiment, no bandwidth is yet allocated to the stream 23. A cue tone 25 occurs at time $T_2$, specifying time, $T_3$, for the start of actual addressable break, but still no bandwidth is allocated. When time $T_3$ arrives as the actual start of addressable break 17, additional bandwidth 9 is now allocated to the addressable content stream and spliced into the broadcast stream nearly instantaneously. Time $T_4$ occurs during the actual break 17 and additional bandwidth 9 remains allocated for the broadcast of the addressable break content. The additional bandwidth 9 is de-allocated immediately at Time $T_5$, the end of the break, as dictated by the cue tone 25 at Time $T_2$, tuning the receiver back to the broadcast stream. At time $T_6$, the addressable break 17 has already ended, but the break window remains open, however no bandwidth is allocated. The break window is closed at a later time $T_7$. It should be noted that, according to one embodiment, the window open and window close events shown in FIG. 4 are irrelevant to allocation of additional bandwidth.

The embodiment of the dynamic bandwidth allocation system described above is more efficient than the schedule-based allocation method. For the example of a twenty minute window with a sixty-second break, previously mentioned, the schedule based system would allocate twenty times more bandwidth for the same break than the dynamic system of the present embodiment (i.e., twenty minutes of costly allocated bandwidth versus sixty seconds), with the same effective bandwidth used. Alternatively, even in an embodiment of the invention in which bandwidth would be allocated immediately upon receipt of the cue tone (at Time $T_2$) instead of at the exact break-start ($T_3$), to provide a buffer, or safety period to ensure available bandwidth, significant efficiencies are still maintained using the dynamic allocation system of the embodiment.

Figure 5:
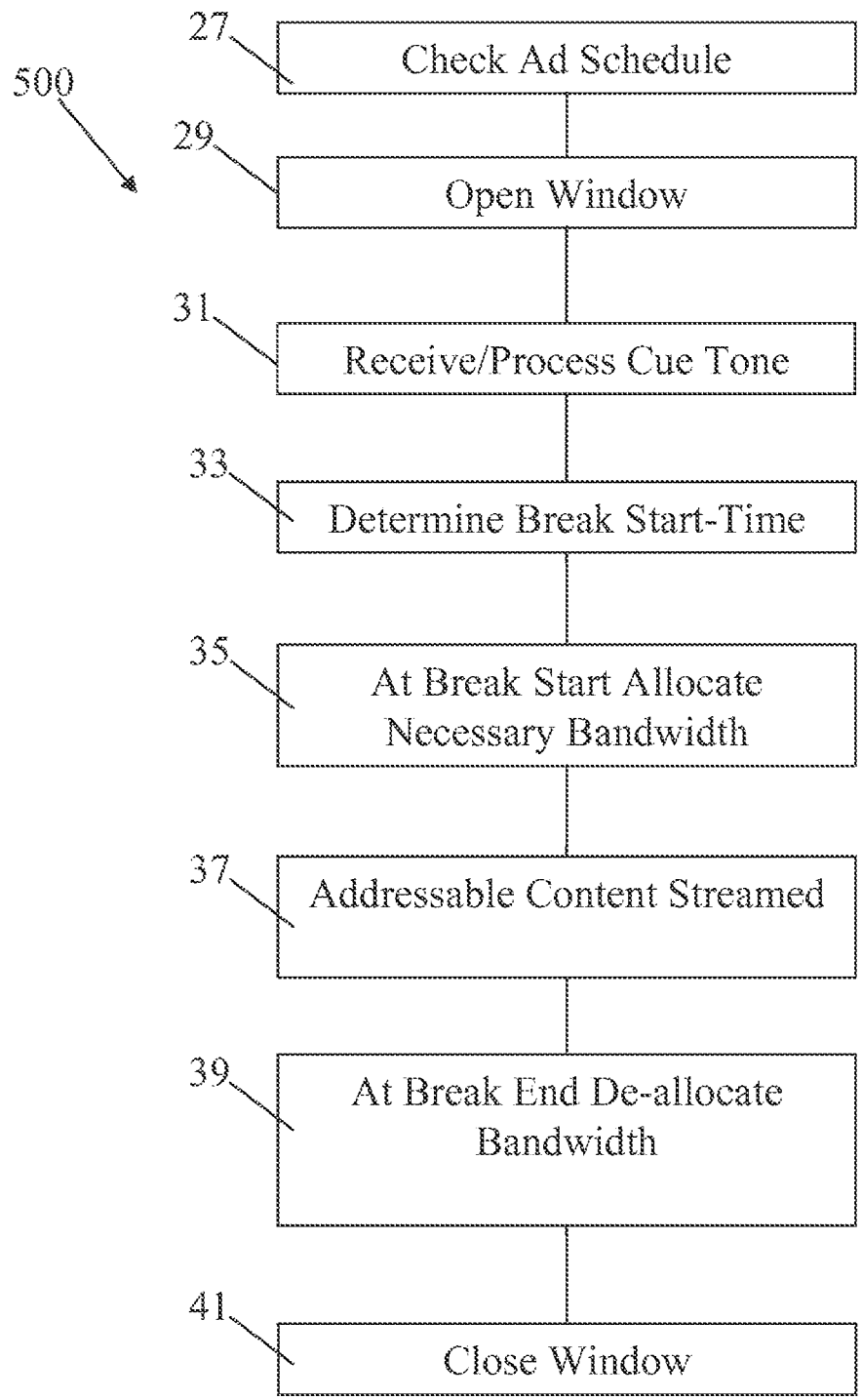
FIG. 5 depicts a method of dynamic bandwidth allocation in accordance with an embodiment of the invention.

One embodiment of the invention includes a method 500 for dynamically allocating bandwidth for addressable content, as depicted in FIG. 5. As described above, each station may have distinct schedule breaks for addressable content to be broadcast to subscribers. The break schedule 27 may be created and managed in a traffic and billing system, and driven by an advertisement insertion module, both described in further detail below. Using the time scale outlined above in connection with FIG. 4, an addressable break window may open 29 at Time $T_0$, indicating the possibility of an upcoming break. At Time $T_1$ a cue tone is received and processed 31 for the start-time, duration, end-time or other data 33. At Time $T_3$, the additional bandwidth is allocated 35 at or near the same time as the actual break begins as contained in the cue tone. At and during Time $T_4$ the additional bandwidth is allocated and used to stream the addressable content 37 to subscriber's receiver. When the addressable break ends, at Time $T_5$, the additional bandwidth is de-allocated 39 and returned to a pool of available bandwidth to be used for other applications or requests. The addressable break window may remain open for a period, $T_6$ after the end of the actual break until the widow is scheduled to close at Time $T_7$ 41.

Figure 6:
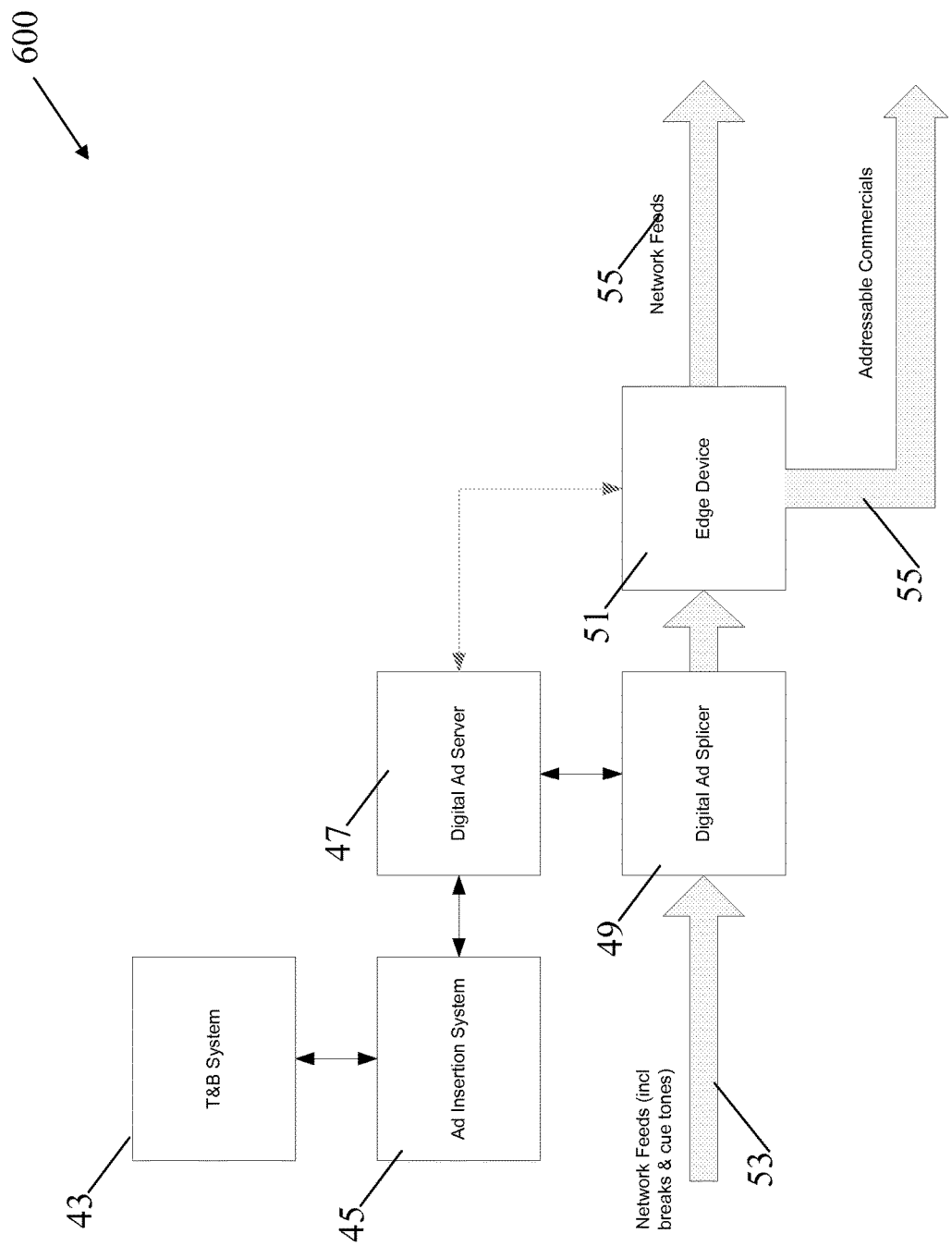
FIG. 6 is a block diagram of a dynamic bandwidth allocation system in accordance with an embodiment of the invention.

Turning now to FIG. 6, an implementation of a dynamic bandwidth allocation system 600 is depicted in accordance with an embodiment of the invention. According to the embodiment, a traffic and billing ("T&B") system module 43 manages the schedules for the local advertising breaks. An advertising insertion system module 45 manages insertion of local commercials in the local breaks. The local commercials inserted in this illustrated embodiment are non-addressable or non-targeted advertisements broadcast to all transmission receivers. A digital ad server 47 manages local commercials for one or more sets of particular ad insertion zones. A digital ad splicer 49 actually splices local digital commercials into the digital network feeds 53. The splicer 49 interacts with the digital ad server 47 by inserting the commercials obtained from the ad server 47. An edge device module 51 manages the addressable commercials by managing and allocating the required bandwidth needed to stream the addressable commercials. When the edge device module 51 detects an addressable break, through a digital cue tone or other signal as described above, the edge device module 51 dynamically allocates the necessary bandwidth for the duration of the break. The edge device module 51 then uses the allocated bandwidth to stream out the commercials 55 in addition to the network feeds 57 and then de-allocates the bandwidth again at the end-time obtained from the cue tone. If multiple, simultaneous, addressable breaks should occur, the edge device module 51 attempts to allocate bandwidth for all of the breaks. Once the edge device module 51 runs out of available bandwidth, it will stop servicing addressable advertising breaks until enough bandwidth is returned. For example, if two or more broadcast channels happen to send cue tones to open up addressable content breaks at the same time, or if the breaks will overlap, the edge device module 51 will attempt to allocate the necessary bandwidth to both, or all channels, having simultaneous or overlapping addressable breaks, until the spectrum of available bandwidth is diminished beyond the capacity to carry further signals.

Figure 7:
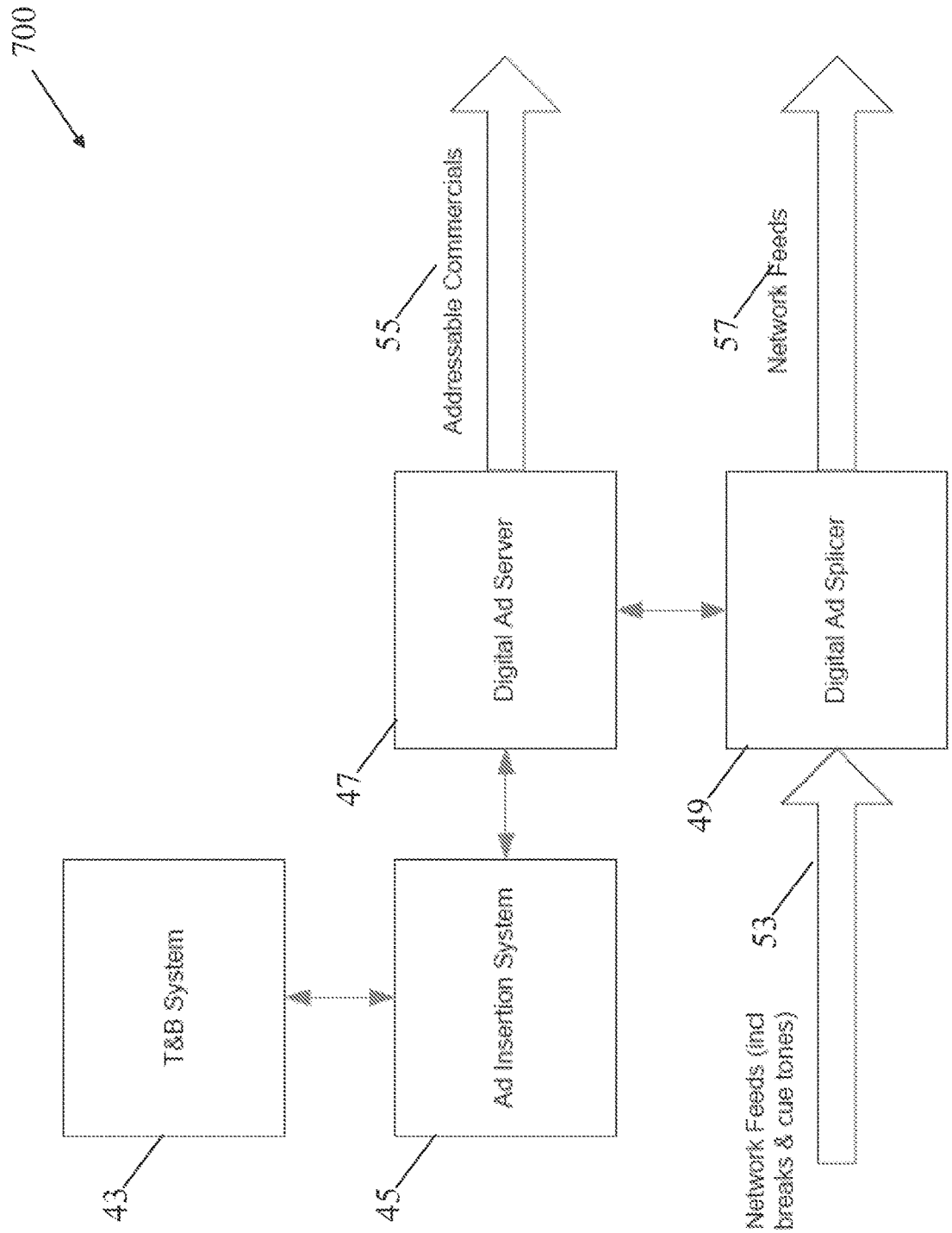
FIG. 7 is a block diagram of a dynamic bandwidth allocation system in accordance with an embodiment of the invention.

In an alternative embodiment, the functionality of the dynamic bandwidth allocation system derived from the edge device, may be built into digital ad servers and/or splicers. An exemplary embodiment 700 is depicted in FIG. 7. A T&B system 43 manages the schedules for the local advertising breaks. The advertising insertion system module 45 manages insertion of local commercials in the local breaks together with a digital as splicer 49. These are regular local commercials, not the addressable commercials. The ad server 47 manages bandwidth for addressable commercials when the splicer 49 detects and notifies the ad server 47 that a digital cue tone has occurred. The ad server 47 will then allocate the necessary bandwidth for the exact duration of the break, as detailed in the cue tone, and use the allocated bandwidth to stream the commercials 55 out to the DSTBs. When the end of the break occurs, the ad server 47 will de-allocate the bandwidth freeing it up for subsequent allocation, and will instruct the splicer 49 to return to the network feed 57. The illustrative embodiment may also handle multiple, simultaneous, addressable advertising breaks as described above in connection with the system of FIG. 6.

Figure 8:
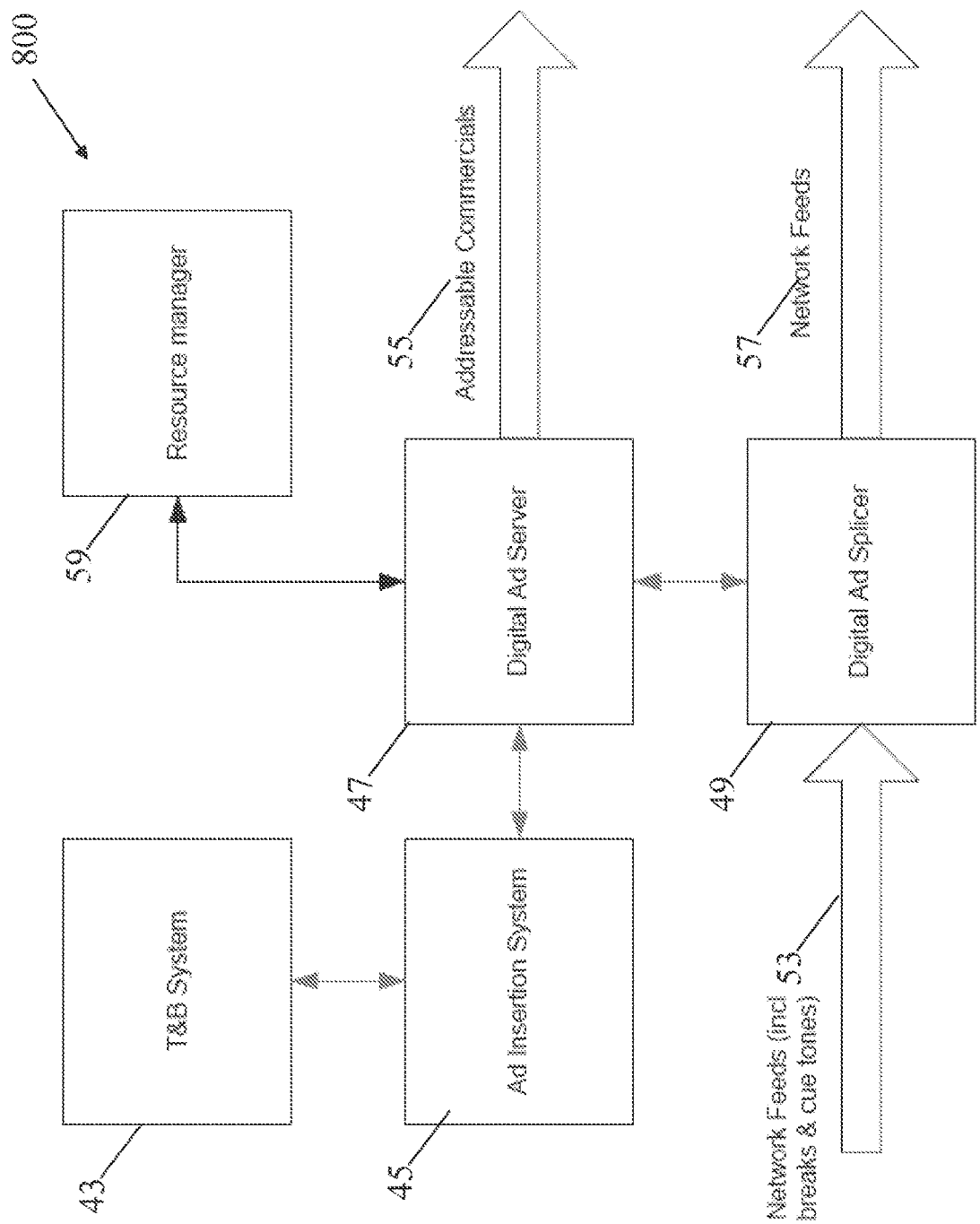
FIG. 8 is a block diagram of a dynamic bandwidth allocation system in accordance with an embodiment of the invention.

According to another embodiment of the invention, as depicted in FIG. 8, a dynamic bandwidth allocation system 800 includes a digital ad server 47 to allocate bandwidth by transmitting a call to a resource manager module 59. A T&B system 43 manages the schedules for the local advertising breaks. The advertising insertion system module 45 manages insertion of local commercials in the local breaks together with a digital ad splicer 49. These are regular local commercials, not the addressable commercials. The ad server 47 further manages bandwidth for addressable commercials when the splicer 49 detects and notifies the ad server 47 that a digital cue tone has occurred. Specifically, the ad server 47 may request bandwidth from the resource manager 59 whenever a cue tone occurs. The resource manager module 59 manages a pool of available bandwidth that may or may not be shared with other bandwidth-intense applications such as VOD, SDV or other applications. The resource manager module 59 receives requests for bandwidth from the digital ad server and can serve these requests based on a prioritization policy, such as a first-come-first served policy. Other more sophisticated, non-linear prioritization policies may also be implemented without deviating from the scope of the invention. The digital ad server will then obtain the necessary bandwidth for the exact duration of the break, as detailed in the cue tone, and use the allocated bandwidth to stream the commercials 55 out to the DSTBs.

When the end of the break occurs, the ad server will return the bandwidth back to the resource manager 59.

Figure 9:
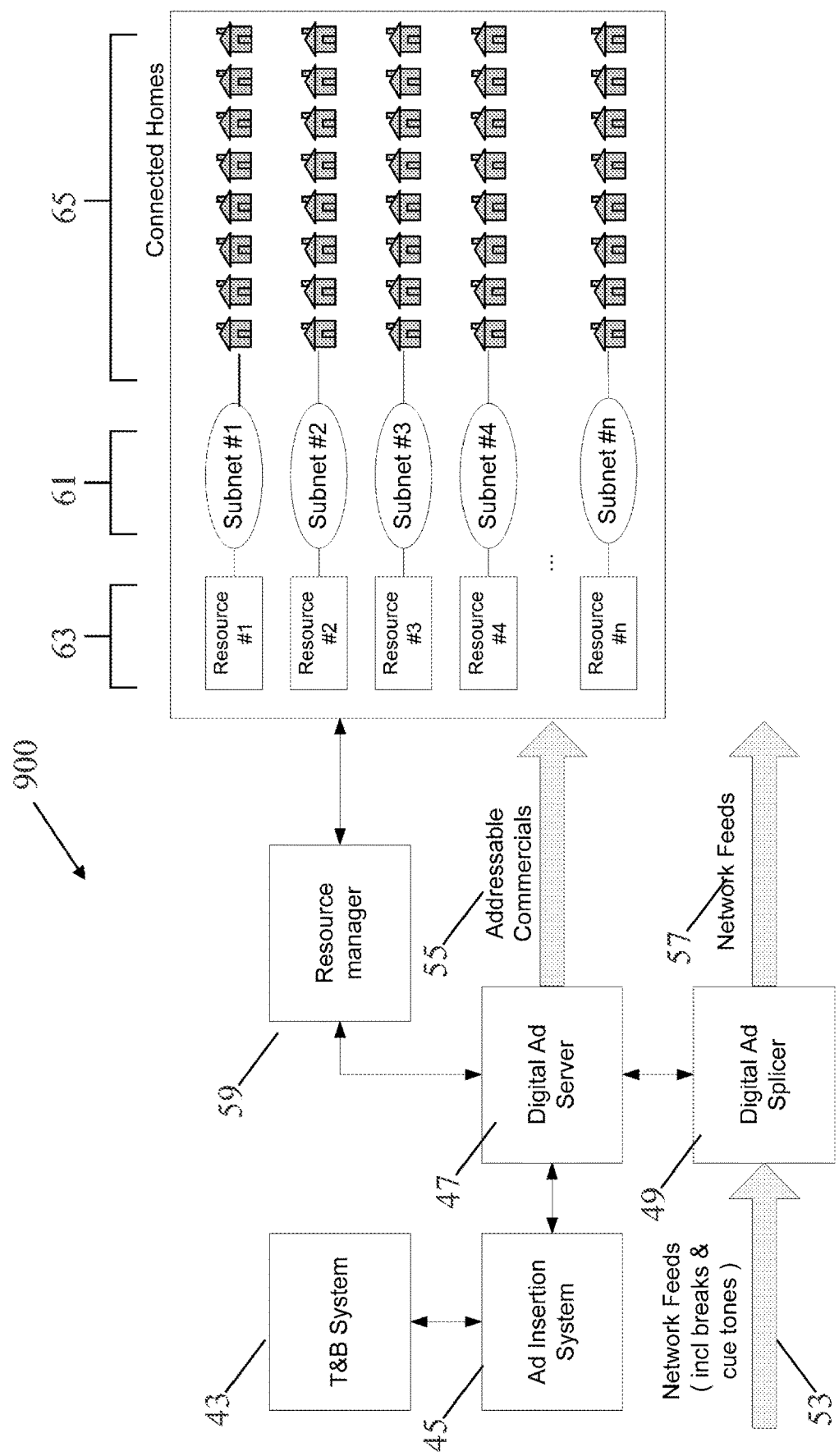
FIG. 9 is a block diagram of a dynamic bandwidth allocation system including a resource manager in accordance with an embodiment of the invention.

According to another embodiment of the invention, as depicted in FIG. 9, a dynamic bandwidth allocation system 900 includes a T&B system 43 that manages the schedules for the local advertising breaks. Whenever an ad splicer 49 receives a digital cue tone, it will notify the ad server 47. The ad server 47 then requests bandwidth for addressable commercials from resource manager 59. The resource manager 59 manages a pool of available network bandwidth. In fact the network is divided up in several sub-networks 61, where each subnetwork 61 has its own bandwidth resource 63. Each subnetwork 61 also represents a number of connected (subscriber) homes 65 within the cable system, direct-to-home satellite system, or IPTV system. An example of such a subnetwork 61 in a cable system is a service group, where depending on the system each service group may comprise several hundred to few thousand subscriber homes 65. When the resource manager 59 receives a request for addressable commercials (A, B, C, D, E) from the ad server 47, the resource manager 59 may allocate that bandwidth in every one of its subnetworks 61. The resource manager 59 knows which individual homes 65 are in each subnetwork 61. The resource manager 59 also knows which home is profiled or targeted with each commercial (A, B, C, D, E). Rather than allocating additional bandwidth for all five commercials (A, B, C, D, E) in all subnetworks 61, the resource manager 59 will only allocate the additional bandwidth for a commercial in a subnetwork 61 if there is at least one home in that subnetwork 61 that will be targeted with that particular commercial. The result is a more efficient bandwidth allocation as illustrated below:

| Subnet# | # | Home Profiles | Bandwidth Allocated |
|---|---|---|---|
| 1 | 7 | A, B, A, B, B, E, A | 3× |
| 2 | 13 | D, B, A, C, A, A, A, A, D, C, C, C, B | 4× |
| 3 | 10 | E, A, E, E, A, E, B, E, E, E | 3× |
| 4 | 18 | C, C, B, A, C, E, D, A, A, B, C, B, E, E, A, B, C, C | 5× |
| 5 | 4 | A, C, C, B | 3× |

For example, Subnet #1 may include seven homes in its defined network. According to the resource manager's profile, those seven homes are targeted to receive commercials A, B and E (three home receiving commercial A, three home receiving commercial B and one home receiving commercial E). Accordingly, the resource manager may only allocate the additional bandwidth required to stream those three commercials to the homes of assigned to Subnet #1, instead of allocating the additional bandwidth for the full five addressable advertisements.

Figure 10:
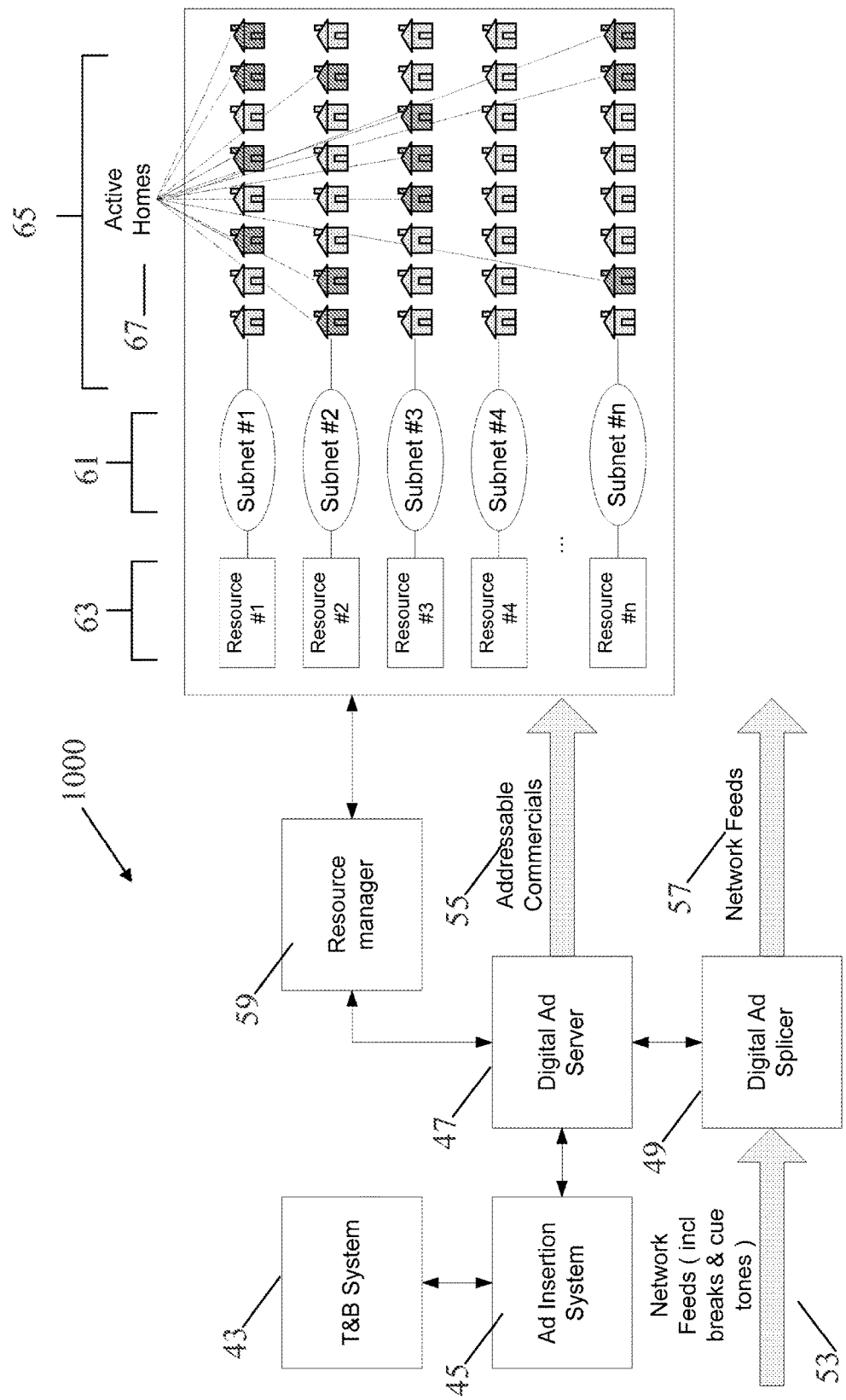
FIG. 10 is a block diagram of a dynamic bandwidth allocation system including a resource manager in accordance with an embodiment of the invention.

According to yet another embodiment of the invention, as depicted in FIG. 10, a dynamic bandwidth allocation system 1000 includes a T&B system 43 that manages the schedules for the local advertising breaks. Whenever an ad splicer 49 receives a digital cue tone, it will notify the ad server 47. The ad server 47 then requests bandwidth for addressable commercials from resource manager 59. The resource manager 59 manages a pool of available network bandwidth. In fact the network is divided up in several sub-networks 61, where each subnetwork 61 has its own bandwidth resource 63. Each subnetwork 61 also represents a number of connected (subscriber) homes 65 within the system. When the resource manager 59 receives a request for addressable commercials (A, B, C, D, E) from the ad server 47, the resource manager 59 may allocate that bandwidth in every one of its subnetworks 61. The resource manager 59 knows which individual homes 65 are in each subnetwork 61. The resource manager 59 also knows which home is profiled or targeted with each commercial (A, B, C, D, E). In addition, the resource manager 59 also knows which of the homes is currently active. A home is active if it is ready to receive one of the addressable commercials (A, B, C, D, E). An example of an active home 67, is a home that is tuned to a channel that is ready to receive an addressable break. As the home is tuned to an appropriate channel, the home is ready to receive one of the addressable commercials at an upcoming addressable break. Rather than allocating bandwidth for all five commercials in all subnetworks 61, the resource manager 59 will only allocate bandwidth for a commercial in a subnetwork, if there is at least one active home in that subnetwork that will be targeted with that commercial. The result is an even more efficient bandwidth allocation as illustrated below:

| Subnet# | # | Active Home Profiles | Bandwidth Allocated |
|---|---|---|---|
| 1 | 7 | A, A, B | 2× |
| 2 | 13 | D, A, C, B | 4× |
| 3 | 10 |  | 0× |
| 4 | 18 | C, C, B, B, C, C | 2× |
| 5 | 4 | A | 1× |

For example, Subnet #1 may include seven homes in its defined network. Of those seven homes, only three homes are currently active (i.e. currently tuned to a channel ready to receive addressable content). Of those three active homes, two are targeted to receive commercial A and one home is targeted to receive commercial B. Because only three homes are currently active, and of those three home, only two addressable commercials are targeted to those homes, bandwidth need only be allocated for two distinct addressable content streams.

While the certain embodiments described herein include a resource manager in system configurations like those shown in FIGS. 8-10, one skilled in the art should recognize that the resource manager may be implemented in alternative system configurations, such as the system of FIG. 6, without deviating from the spirit and scope of the invention.

While the embodiments described herein are depicted as modular systems with defined functionalities, one skilled in the art should recognize that the present invention is not limited to the exemplary embodiments and other system architectures using different combinations of functionality in digital ad servers, digital ad splicers, edge devices, and resource managers may be implemented without deviating from the scope of the invention.

While the invention has been described with reference to illustrative embodiments, it will be understood by those skilled in the art that various other changes, omissions and/or additions may be made and substantial equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed for carrying out this invention, but that the invention will include all embodiments falling within the scope of the appended claims. Moreover, unless specifically stated, any use of the terms first, second, etc. do not denote any order or importance, but rather the terms first, second, etc. are used to distinguish one element from another.

The invention claimed is:

1. A method comprising:
   receiving data indicating at least a start time of an addressable break in a content stream;
   allocating, based on the data, prior to the start time of the addressable break, a portion of available bandwidth to an addressable content stream;
   streaming, by an edge device and for an entire duration of the addressable break starting at the start time, the addressable content stream; and
   de-allocating, after the entire duration of the addressable break, the portion of available bandwidth.

2. The method of claim 1, further comprising switching, for the entire duration of the addressable break, the edge device to the addressable content stream.

3. The method of claim 1, wherein:
   allocating the portion of the available bandwidth comprises allocating, substantially at the start time of the addressable break, the portion of the available bandwidth; and
   de-allocating the portion of the available bandwidth comprises de-allocating, substantially at an end time of the addressable break, the portion of the available bandwidth.

4. The method of claim 1, wherein the addressable content stream comprises a targeted advertisement.

5. The method of claim 1, wherein the data comprises at least one of a trigger and a cue tone.

6. The method of claim 1, wherein at least a portion of the content stream comprises non-addressable content.

7. The method of claim 1, wherein the data further indicates an end time of the addressable break, the entire duration of the addressable break being defined between the start time and the end time.

8. An apparatus comprising:
   a processor; and
   a memory storing instructions that, when executed by the processor, cause the apparatus to:
      receive data indicating at least a start time of an addressable break in a content stream;
      allocate, based on the data, prior to the start time of the addressable break, a portion of available bandwidth to an addressable content stream;
      stream, by an edge device, and for an entire duration of the addressable break starting at the start time, the addressable content stream; and
      de-allocate, after the entire duration of the addressable break, the portion of available bandwidth.

9. The apparatus of claim 8, wherein the instructions, when executed, further cause the apparatus to switch, for the entire duration of the addressable break, the edge device to the addressable content stream.

10. The apparatus of claim 8, wherein:
    allocating the portion of the available bandwidth comprises allocating, substantially at the start time of the addressable break, the portion of the available bandwidth; and
    de-allocating the portion of the available bandwidth comprises de-allocating, substantially at an end time of the addressable break, the portion of the available bandwidth.

11. The apparatus of claim 8, wherein the addressable content stream comprises a targeted advertisement.

12. The apparatus of claim 8, wherein the data comprises at least one of a trigger and a cue tone.

13. The apparatus of claim 8, wherein at least a portion of the content stream comprises non-addressable content.

14. The apparatus of claim 8, wherein the data further indicates an end time of the addressable break, the entire duration of the addressable break being defined between the start time and the end time.

15. A non-transitory computer-readable storage medium storing instructions that, when executed by a processor of an apparatus, cause the apparatus to:
    receive data indicating at least a start time of an addressable break in a content stream;
    allocate, based on the data, prior to the start time of the addressable break, a portion of available bandwidth to an addressable content stream;
    stream, by an edge device and for an entire duration of the addressable break starting at the start time, the addressable content stream; and
    de-allocate, after the entire duration of the addressable break, the portion of available bandwidth.

16. The non-transitory computer-readable storage medium of claim 15, wherein the instructions, when executed, further cause the apparatus to switch, for the entire duration of the addressable break, the edge device to the addressable content stream.

17. The non-transitory computer-readable storage medium of claim 15, wherein:
    allocating the portion of the available bandwidth comprises allocating, substantially at the start time of the addressable break, the portion of the available bandwidth; and
    de-allocating the portion of the available bandwidth comprises de-allocating, substantially at an end time of the addressable break, the portion of the available bandwidth.

18. The non-transitory computer-readable storage medium of claim 15, wherein the addressable content stream comprises a targeted advertisement.

19. The non-transitory computer-readable storage medium of claim 15, wherein the data comprises at least one of a trigger and a cue tone.

20. The non-transitory computer-readable storage medium of claim 15, wherein the data further indicates an end time of the addressable break, the entire duration of the addressable break being defined between the start time and the end time.

* * * * *